G. W. Staats,
Scroll Sawing Machine.
N°82,171.   Patented Sep.15,1868.

Witnesses:                                   Inventor:
Wm A Morgan                                  G. W. Staats
G C Cotton                                   per Munn & Co
                                             Attorneys 2 Sheets—Sheet 2.

G. W. Staats,
Scroll Sawing Machine.

N° 82,171. Patented Sep. 15, 1868.

Witnesses:

Wm. A. Morgan
J. C. Cotton

Inventor:

G. W. Staats
per Munn & Co.
Attorneys

N. PETERS, PHOTO-LITHOGRAPHER, WASHINGTON, D. C.

United States Patent Office.

G. W. STAATS, OF NEWCASTLE, PENNSYLVANIA.

Letters Patent No. 82,171, dated September 15, 1868.

IMPROVEMENT IN GUIDES FOR SCROLL-SAWS.

*The Schedule referred to in these Letters Patent and making part of the same.*

TO ALL WHOM IT MAY CONCERN:

Be it known that I, G. W. STAATS, of Newcastle, in the county of Lawrence, and State of Pennsylvania, have invented new and useful Improvements in Guides for Scroll-Sawing; and I do hereby declare that the following is a full, clear, and exact description thereof, which will enable others skilled in the art to make and use the same, reference being had to the accompanying drawings, forming part of this specification, in which—

Similar letters of reference indicate like parts.

The object of this invention is to enable irregular figures and curves to be sawn from wood by a scroll-saw without the necessity of working to a line, which latter operation is properly performed by a skillful workman, besides requiring the figure to be marked in the wood to guide the operator.

I employ two guides or guide-plates, each differing from the other in construction, but both operating on the same general principle. The first guide is used under the work to be sawn, and the second over the said work, as will hereinafter be fully set forth.

My first method consists in employing a metal guide-plate, A $a$, the base, A, of which is let into the saw-table E, leaving the part $a$ to project upward, as shown. The part $a$ is oval, and encloses the saw D with easy contact.

B is the profile or pattern from which the wood is to be sawn.

Figure 1:
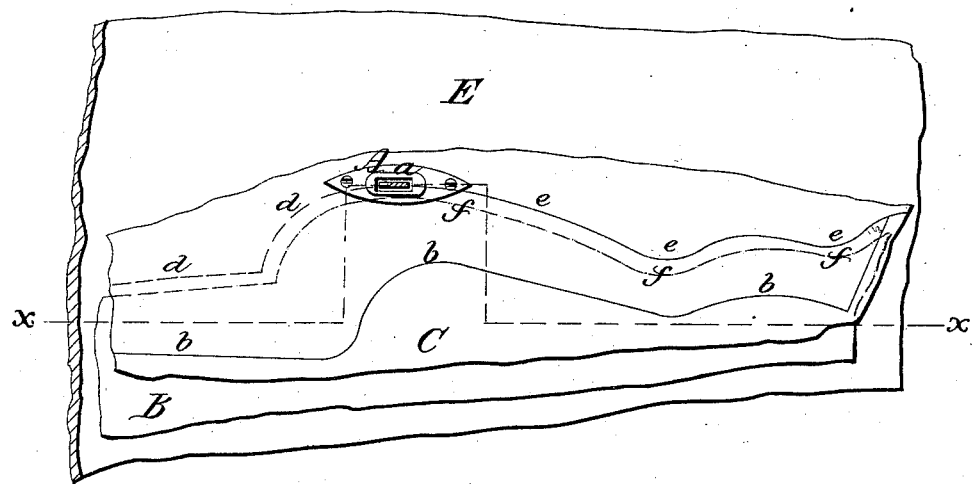
Figure 1 is a plan view of my invention, and showing the method of using the same.
Figure 2:
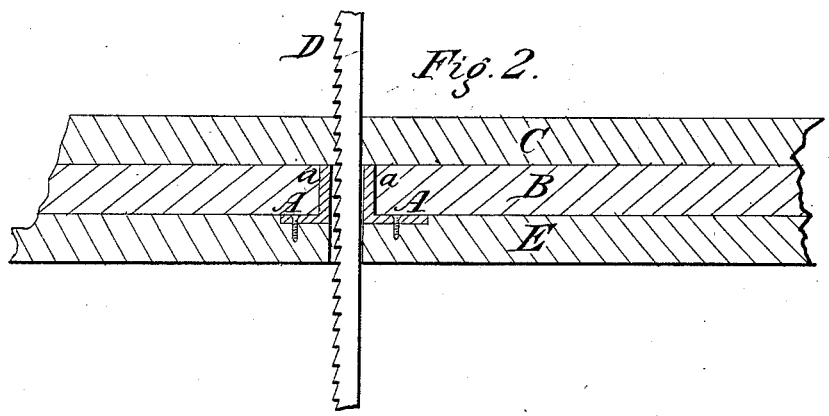
Figure 2 is a section of fig. 1 through the line $x\ x$ of that figure.
Figure 3:
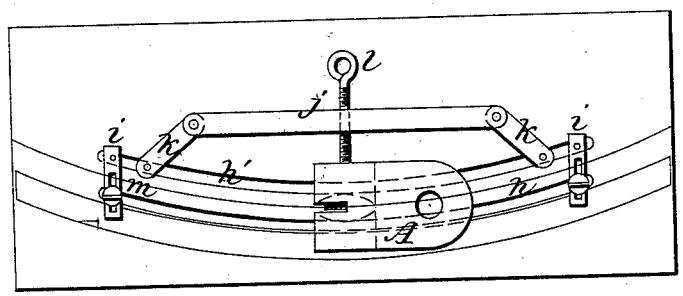
Figure 3 is a top view of the guide for sawing arcs of great radius.
Figure 4:
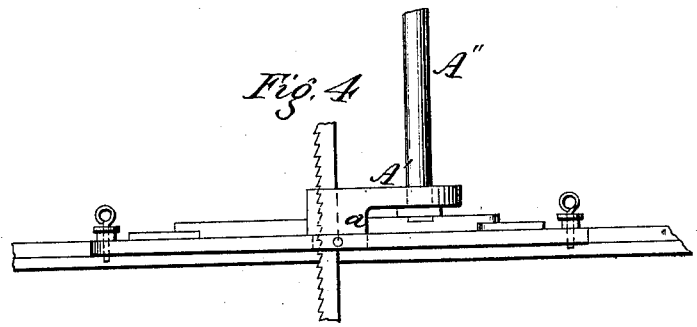
Figure 4 is a side view of the same.

C represents the plank or board being sawn. This latter is laid upon the pattern, (the outline of which is shown in blue color in fig. 1,) and affixed thereto temporarily by means of nails or brads. The pattern thus bearing the wood is brought to the guide, and the profile resting against the guide, bears the wood C along with it, thus enabling the saw to cut a line, $e\ e\ e$, conforming, in contour, to the profile $f\ f\ f$ of the pattern B.

The dotted line $d\ d$ shows the perspective path of the saw as the pattern is moved along in contact with the guide.

By this means any variety and complex configuration may be cut by a person of ordinary intelligence, thus dispensing with a skilled sawyer.

The guides are made of any soft metal, as block-tin, or an alloy of the same with other metals, to produce a composition that will not cause injurious friction with the saw.

The second form of guide is more particularly intended for use for curves of great radius, and as its perfect operation is dependent upon certain accessory parts, it is best adapted to set over the works, allowing the latter to pass under and in contact with it, as it does under the common holding-down foot generally used in scroll-sawing.

In this instance, the guide-plate A′ $a'$ is arranged with its base, A′, upward, it being affixed on the end of the rod A″, which is ordinarily employed to support the holding-down foot heretofore used.

The guide-plate A′ $a'$ is thus held above the saw-table, and the work passed under it, the guide serving to hold the latter down, in place of the foot, as aforesaid.

When the guide is thus used above the work, it does not enclose the saw, as in the first case, but has merely a slot, to steady the saw, as shown.

In connection with the upper guide, I employ auxiliary guide-plates $h\ h'$, which are held parallel to each other by links $i\ i$, one end of which links is pivoted to the ends of the plate $h'$, the other ends being respectively connected to the ends of the plate $h$ by means of set-screws passing through slots in the links, and working in hollow threads cut in the plate $h$.

The plates $h\ h'$ are spring-metal, and so that they may be bent to any requisite curvature.

These plates are bent, and held so bent, by means of plates $k\ j\ k$, pivoted together, and to the plate $h'$, as shown, and a set-screw, $l$, passing through the plate $j$, with its point arranged to bear against the side of the guide-plate $A'$ $a'$.

The plates $h$ $h'$ are arranged on each side of the part $a'$ of the guide-plate $A'$ $a'$, riveted thereto. Now, by screwing in the screw $l$, the plate $h'$ will be correspondingly curved, with sufficient approximation for the purpose, to form a circular arc.

The plate $h$ is then brought parallel to it, and thus affords a guide-surface of greater bearing than would the part $a$.

These auxiliary guide-plates $h$ $h'$ are designed to afford a greater extent of bearing for the pattern when circular work of great radius is being sawn, for in such work the pattern would be liable to deviate somewhat if the part $a$ alone were used.

The blue and red lines represent, respectively, wood being sawn, and the pattern.

Having thus described my invention, I claim as new, and desire to secure by Letters Patent—

1. The guide $A$ $a$, substantially as described, in combination with a scroll-saw and a pattern, all as and for the purpose set forth.

2. The auxiliary guide-plates $h$ $h'$, links $i$ $i$, and suitable accessory plates $k$ $j$ $k$ and screw $l$, for giving the proper curvature to the plates $h$ $h'$, all substantially as shown and described, in combination with the guide-plate $A'$ $a'$ and a scroll-saw, all as set forth.

G. W. STAATS.

Witnesses:
   JAS. DICKSON,
   WILLIS EMERY.